United States Patent
Rico Carro et al.

(10) Patent No.: US 10,664,419 B2
(45) Date of Patent: May 26, 2020

(54) I/O DRIVEN DATA TRANSFER IN A DATA PROCESSING NETWORK

(71) Applicant: Arm Limited, Cambridge (GB)

(72) Inventors: Alejandro Rico Carro, Austin, TX (US); Pavel Shamis, Austin, TX (US); Stephan Diestelhorst, Cambridge (GB)

(73) Assignee: Arm Limited, Cambridge (GB)

(*) Notice: Subject to any disclaimer, the term of this patent is extended or adjusted under 35 U.S.C. 154(b) by 0 days.

(21) Appl. No.: 15/881,937

(22) Filed: Jan. 29, 2018

(65) Prior Publication Data
US 2019/0129871 A1   May 2, 2019

Related U.S. Application Data

(63) Continuation-in-part of application No. 15/801,995, filed on Nov. 2, 2017.

(51) Int. Cl.
| | |
|---|---|
| *G06F 13/16* | (2006.01) |
| *G06F 12/084* | (2016.01) |
| *G06F 13/40* | (2006.01) |
| *G06F 13/42* | (2006.01) |
| *G06F 12/0871* | (2016.01) |
| *H04L 12/851* | (2013.01) |
| *H04L 12/741* | (2013.01) |
| *G06F 12/0811* | (2016.01) |
| *G06F 12/0888* | (2016.01) |
| *H04L 12/933* | (2013.01) |
| *H04L 29/08* | (2006.01) |

(52) U.S. Cl.
CPC ........ *G06F 13/1642* (2013.01); *G06F 12/084* (2013.01); *G06F 12/0811* (2013.01); *G06F 12/0871* (2013.01); *G06F 12/0888* (2013.01); *G06F 13/4086* (2013.01); *G06F 13/4234* (2013.01); *H04L 45/745* (2013.01); *H04L 47/2433* (2013.01); *G06F 2212/1024* (2013.01); *G06F 2212/254* (2013.01); *G06F 2212/284* (2013.01); *G06F 2212/604* (2013.01); *H04L 49/10* (2013.01); *H04L 67/2852* (2013.01)

(58) Field of Classification Search
CPC ......... H04L 49/90; H04L 69/22; G06F 9/546; G06F 2209/548
USPC ..... 370/412, 392, 389, 474; 710/40, 52, 268
See application file for complete search history.

(56) References Cited

U.S. PATENT DOCUMENTS

| | | | |
|---|---|---|---|
| 5,640,599 A * | 6/1997 | Roskowski | G06F 15/17 710/106 |
| 6,247,084 B1 * | 6/2001 | Apostol, Jr. | G06F 13/1684 710/100 |
| 6,643,710 B1 | 11/2003 | Thorne et al. | |

(Continued)

*Primary Examiner* — Faisal M Zaman
(74) *Attorney, Agent, or Firm* — Leveque Intellectual Property Law, P.C.

(57) ABSTRACT

A method and apparatus are provided for assigning transport priorities to messages in a data processing system. An incoming message at an input/output (I/O) interface of the data processing system includes a message identifier and payload data. Match information, including an indicator or whether the message identifier of the incoming message matches an identifier of a request in a receive queue (RQ), is used to assign a transport priority value to the incoming message. The incoming message is transported to the destination node through an interconnect structure dependent upon the assigned transport priority value.

17 Claims, 7 Drawing Sheets

(56) References Cited

U.S. PATENT DOCUMENTS

| | | | |
|---|---|---|---|
| 6,771,665 B1* | 8/2004 | Reed | H04L 63/0807 370/475 |
| 7,538,772 B1* | 5/2009 | Fouladi | G06F 13/1605 345/531 |
| 8,170,041 B1* | 5/2012 | Underwood | G06F 13/385 370/229 |
| 2004/0225781 A1* | 11/2004 | Kotlowski | G06F 13/364 710/200 |
| 2005/0063377 A1* | 3/2005 | Bryant | H04L 43/18 370/389 |
| 2006/0259656 A1* | 11/2006 | Sullivan | G06F 13/102 710/22 |
| 2008/0162760 A1* | 7/2008 | Jacob | G06F 13/1642 710/244 |
| 2009/0006526 A1* | 1/2009 | Gingell, Jr. | G06F 9/5055 709/202 |
| 2009/0225769 A1* | 9/2009 | Wang | H04L 49/90 370/412 |
| 2010/0005470 A1* | 1/2010 | Simon | G06F 13/30 718/103 |
| 2010/0232448 A1* | 9/2010 | Sugumar | G06F 15/17337 370/412 |
| 2011/0265098 A1* | 10/2011 | Dozsa | G06F 9/546 719/314 |
| 2013/0219410 A1 | 8/2013 | Archer et al. | |
| 2013/0290656 A1* | 10/2013 | Staelin | G06F 13/18 711/158 |
| 2015/0058858 A1* | 2/2015 | Plattner | G06F 9/4881 718/103 |
| 2015/0143053 A1 | 5/2015 | Quimbey et al. | |
| 2015/0227312 A1 | 8/2015 | Feehrer et al. | |
| 2015/0234756 A1* | 8/2015 | Tuers | G06F 13/18 710/308 |
| 2017/0039144 A1 | 2/2017 | Wang et al. | |
| 2017/0094010 A1 | 3/2017 | Dinan et al. | |
| 2017/0163662 A1 | 6/2017 | Zhou et al. | |
| 2017/0249081 A1* | 8/2017 | Tzori | G06F 13/24 |
| 2018/0191624 A1* | 7/2018 | Haynold | H04L 47/283 |
| 2018/0234498 A1* | 8/2018 | Sangameswaran | H04L 67/12 |
| 2019/0102236 A1 | 4/2019 | Sur et al. | |
| 2019/0102301 A1 | 4/2019 | Li et al. | |

* cited by examiner

I/O DRIVEN DATA TRANSFER IN A DATA PROCESSING NETWORK

CROSS-REFERENCE TO RELATED APPLICATIONS

This application is a continuation-in-part of U.S. patent application Ser. No. 15/801,995 entitled "I/O DRIVEN DATA ROUTING AND CACHE ALLOCATION", filed Nov. 2, 2017, which is hereby incorporated by reference in its entirety.

BACKGROUND

In a data processing system, data may be received or transmitted via an input/output (I/O) interface. This may be an I/O controller interface to an off-chip data resource or a network interface controller (NIC) to a resource of a local or remote network.

When data is received from an I/O interface it is directed to a storage resource of the data processing system. Selection of which storage is to be used may be controlled by software or hardware configuration of the data processing system. However, this approach is not optimal since the usage of the received data is difficult to predict. As a result, data directed to a memory device may need to be moved at once to a processor cache for use, resulting in additional memory transfers, while data stored directly in a cache, via a cache stashing mechanism for example, may not be needed, wasting cache space and requiring additional memory transfers to evict the data back to memory.

A data processing system may be arranged as a network, such as network on a chip, that includes a number of nodes coupled via an interconnect structure. Data transfer in and out of the network is controlled by one or more input/output (I/O) interfaces that provide access to an off-chip data resource. Data is transferred between a processing node of the network and the I/O interface via the interconnect structure.

Since an interconnect structure has limited bandwidth, some data transfers may be delayed. Performance of the data processing system may be degraded when a time-critical data transfer is delayed. One approach to mitigating this problem is to use an interconnect structure that enables a processing node to prioritize transfers. For example, a software instruction issued by a processing node to access data at a particular address may include an argument indicative of the priority of the access.

This approach is ineffective, however, since a user may not be able to determine in advance what the priority should be. There will be a tendency for a user to make all requests high priority.

BRIEF DESCRIPTION OF THE DRAWINGS

The accompanying drawings provide visual representations which will be used to more fully describe various representative embodiments and can be used by those skilled in the art to better understand the representative embodiments disclosed and their inherent advantages. In these drawings, like reference numerals identify corresponding elements.

DETAILED DESCRIPTION

The various apparatus and devices described herein provide mechanisms for automatic routing and allocation of incoming data in a data processing system.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawings.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

A first aspect of the present disclosure relates to a mechanism in a data processing system that automatically determines the destination of data received at an input/output (I/O) interface. For example, data may be allocated to a cache or a memory of the data processing system.

A second aspect of the present disclosure relates to a mechanism in a data processing system that automatically determines the priority with which a message, received at an input/output (I/O) interface, is transported through the data processing system.

The disclosure will be described with reference to a multi-core architecture with a cache coherent interconnect (CCI) that connects a set of processing core clusters, a set of home nodes (HN) including a system level cache (SLC) shared across all cores, a set of memory controllers and I/O device interfaces. In general, the data processing system includes a plurality of data storage resources, such as caches and memories.

Figure 1:
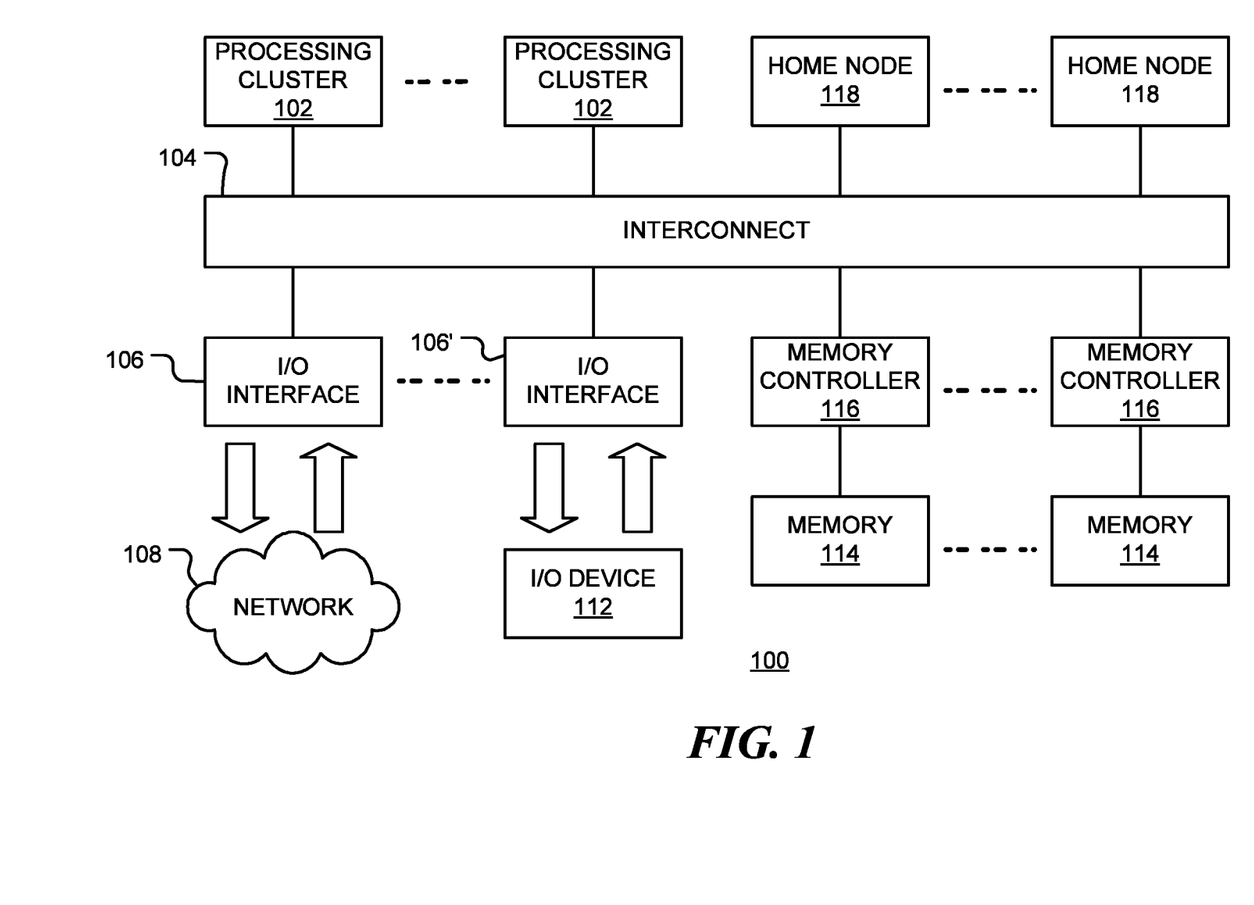
FIG. 1 is a block diagram of a data processing system, in accordance with various representative embodiments.

FIG. 1 is a block diagram of a data processing system 100, in accordance with various representative embodiments. A number of processing core clusters 102 are coupled to data resources via cache coherent interconnect (CCI) 104. Data is received via input/output (I/O) interfaces. In the example shown, I/O interface 106 comprises a network interface controller (NCI) that receives data from network 108 and I/O interface 106' receives data from I/O device 112. Data may be stored in one or more memory or storage devices 114 that are coupled to interconnect 104 via memory controllers 116. Home nodes (HN) 118 include system level caches. Each home node (HN) serves as a point of coherence for data stored at a given system address. Data received from I/O interfaces 106 and 106' may be routed to a home node. The home node then stored the data in a system level cache of the HN or sends it to a memory controller 116 for storing in a memory 114. Alternatively, using a process referred to as 'cache stashing', data received at I/O interfaces 106 and 106' may be routed to a cache of a processing cluster 102. Cache stashing is the mechanism through which an I/O interface can write data to a core private caches (L1, L2) or cluster cache (L3) of a processing cluster.

In prior data processing systems, the destination for data received at an I/O interface is determined by user programming instructions, software configuration or hardware configuration. However, this approach is not optimal since the usage of the received data is difficult to predict. As a result, data directed to a memory device may need to be moved at once to a processor cache for use, resulting in additional memory transfers, while data stored directly in a cache, via a cache stashing mechanism for example, may not be needed, wasting cache space and requiring additional memory transfers to evict the data back to memory.

In accordance with an aspect of the disclosure, a mechanism is provided for automatically deciding if a particular message should enable/disable cache stashing for the message. When cache stashing is disabled, particular message attributes are used to influence the cache allocation policy in the system level cache. The decision may be based on message attributes (tags, source address, payload size etc.) and the status of I/O message queues.

Figure 2:
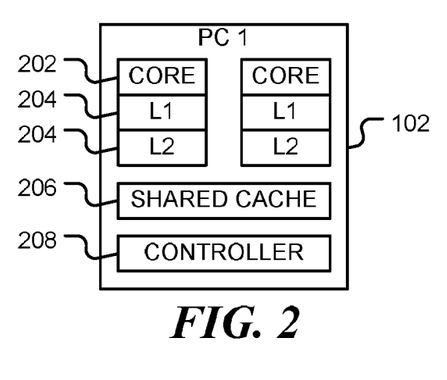
FIG. 2 is a block diagram of processing cluster, in accordance with various representative embodiments.

FIG. 2 is a block diagram of processing cluster 102, in accordance with various representative embodiments. The processing cluster 102 includes one or more processing cores 202, one or more core-private caches 204 for each core, and a cluster-private cache 206 that is shared between processing cores. For example, core-private caches 204 may comprise L1 and L2 caches, as shown, and cluster-private cache 206 may be an L3 cache. Movement of data in and out of the caches is controlled by cache controller 208. Cache controller 208 also provides a stashing mechanism that allows an I/O interface to write data directly into the core-private or cluster-private caches of a requesting processing cluster.

Figure 3:
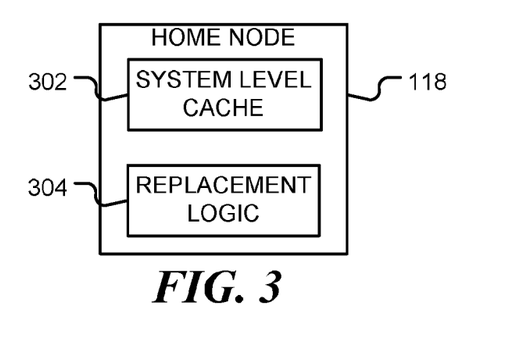
FIG. 3 is a block diagram of a home node, in accordance with various representative embodiments.

FIG. 3 is a block diagram of a home node (HN) 118, in accordance with various representative embodiments. The home node 118 serves as a point of coherence for data stored in a system level cache 302. Movement of data in and out of the cache is controlled by replacement logic 304. For example, the replacement logic may keep track of which cache lines are most recently used (MRU) and which are least recently used (LRU). The logic may include an address or tag stack, for example. The home node may also include other elements, such as a snoop filter and a snoop controller to enable coherence management. When cache stashing is disabled for a message, the data is sent to the HN which decides whether to allocate the data into the SLC or bypass it to memory depending on the value of an 'allocate' attribute of the message which can be true of false. In the case of allocation in the cache, the HN can also decide where in the least-recently-used (LRU) stack the data is inserted based on the value of a 'priority' attribute of the message.

Figure 4:
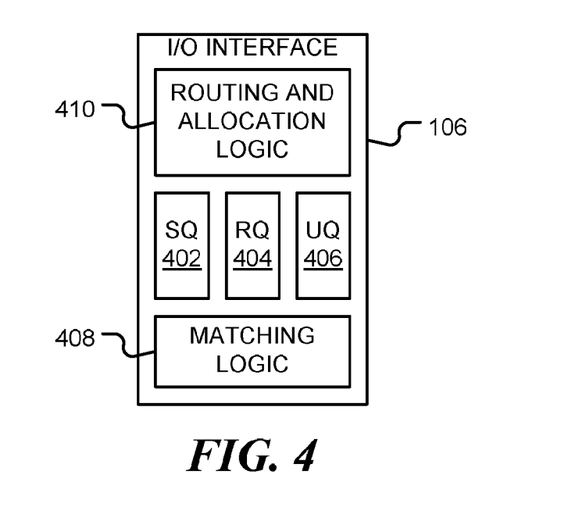
FIG. 4 is a block diagram of an input/output (I/O) interface, in accordance with various representative embodiments.

FIG. 4 is a block diagram of an input/output (I/O) interface 106, in accordance with various representative embodiments. I/O interface 106 operates in accordance with a message queuing protocol, and includes a message send queue (SQ) 402, a message receive queue (RQ) 404 and an unexpected queue (UQ) 406 for unexpected messages. In other embodiments, such as with a virtual local area network (VLAN) or a software defined network (SDN), the receive queue may be implemented as a matching table. In a receive queue, each incoming message is matched to entry in the queue. When a match is found, the entry is removed from the receive queue. In contrast, with a matching table, the incoming message is matched against an entry in the table, but the entry itself is not removed until an explicit instruction to remove is issued. The embodiments below are described with respect to a receive queue. However, in general any structure for storing receive requests may be used. Herein, the term 'receive queue' is taken to include all such structures including, but not limited to, queues, tables and other structures.

In one embodiment, the message queueing protocol implements the Message Passing Interface (MPI) and programming model. MPI is a de-facto standard that provides a programming model and communication services for high-performance computing (HPC) applications including scientific simulations, big-data, machine learning and analytics. However, the mechanism disclosed here is not limited to HPC or MPI. Other message schemes that utilize queues and tag matching logic may be used. For example, I/O mechanisms based on queue constructs, such as Quality of Service (QoS), Virtual Local Area Networks (VLANs), and Software Defined Networking (SDN) technologies may be used. Each one of these technologies associate a tag (or any other message identifying attribute) on the sender side and utilizes a receive queue (RQ).

MPI is an abstract communication framework that defines point-to-point send-receive communication semantics that are used for communication between processing elements (PEs) or other devices. The send-receive semantics are realized in hardware in I/O interface 106 using send queue (SQ) 402 and receive queue (RQ) 404. In order to send a message, a processing element (PE) posts a send request to the SQ. In order to receive a message, a PE posts a request to the RQ. Each send and receive request can be associated with a tag, which is the message identifier. In addition, each request is associated with a virtual address (or vector), which is a reference to the data payload. When message comes from a network, matching logic 408 compares the tag of the incoming message to the tags associated with requests in RQ 404. If the incoming tag matches one of the requests, it means that the application waits (or expects) on the message. If a request with matching tag cannot be found in RQ 404, the incoming message is redirected to unexpected queue (UQ) 406. UQ 406 manages incoming messages that the application is not ready to receive.

In accordance with the present disclosure, routing and allocation logic 410 is provided for automatic routing of data received at an I/O interface. Routing and allocation logic 410 may be implemented as a component of I/O interface 106 (as shown) or may be a separate module. Routing and allocation logic 410 provides a mechanism that connects the SQ, RQ, UQ and I/O message matching logic (based on tag or any other attribute identifying the message) to on-chip CCI stash caching and allocation logic to provide automatic routing of data.

Figure 5:
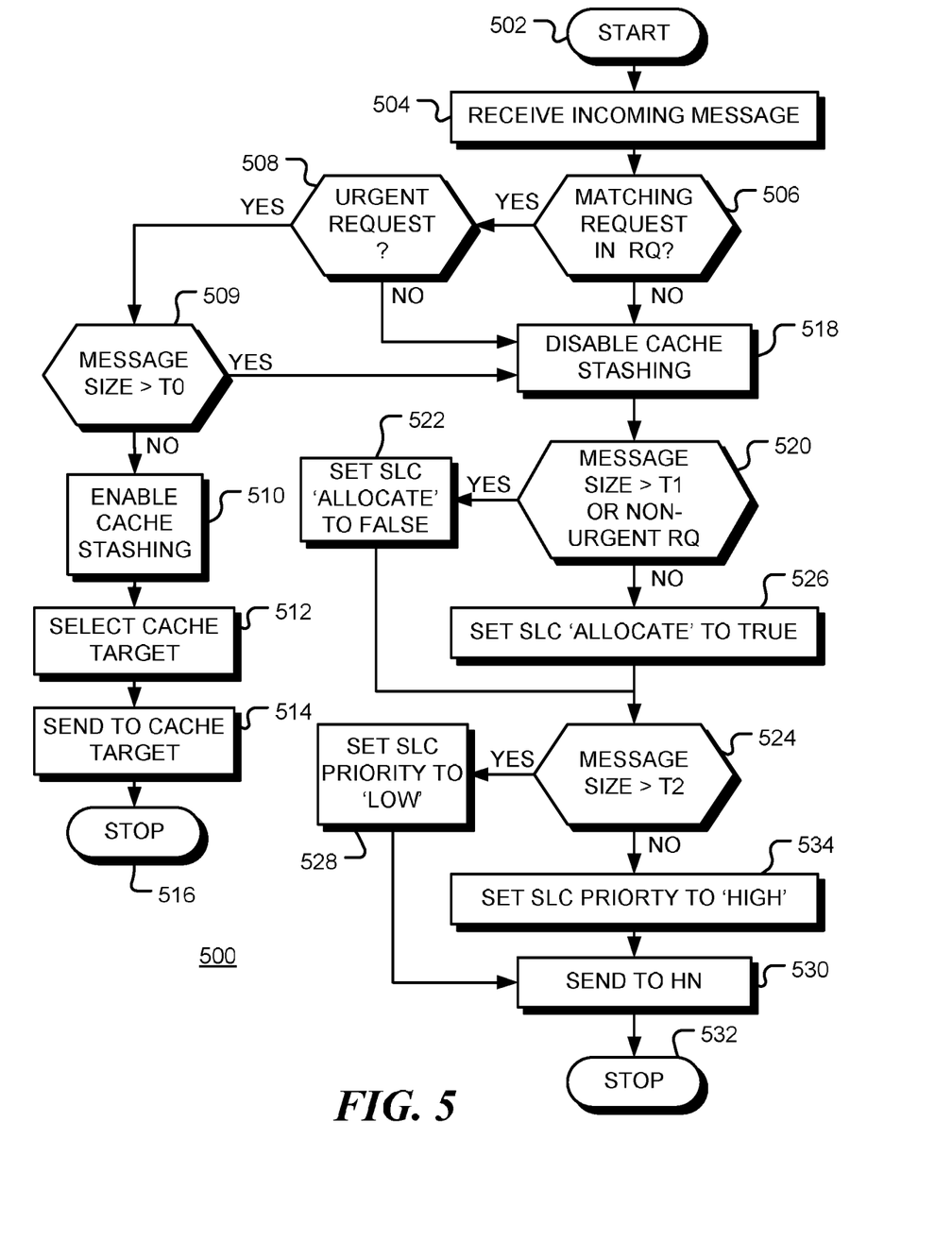
FIG. 5 is a flow chart of a method for automatic routing of data received at an I/O interface of data processing system, in accordance with various representative embodiments of the disclosure.

FIG. 5 is a flow chart of a method 500 for automatic routing of data received at an I/O interface of data processing system, in accordance with embodiments of the disclosure. The method may be implemented in dedicated hardware, in software configured hardware, in software, or in a combination of these. Following start block 502, an incoming message is received from a network or I/O device at block 504. If a matching request is found in the receive queue (RQ), as indicated by the positive branch from decision block 506, it may be appropriate for the routing and allocation logic to enable cache stashing. For a messaging protocol that employs ordering rules based on the message tag attribute, the location of the matching request in the RQ is used to determine if the request is urgent or not. If the incoming message arrives out of order, which means that the matching receive tag is located relatively far from the head of the queue (as defined by a selected threshold) in the receive queue, then message is determined not to be urgent and the cache-stashing mechanism can be disabled, as depicted by the negative branch from decision block 508. This prevents pollution of the core-private and cluster-private caches by out-of-order messages. However, if the request is judged to be urgent (e.g. near the head of the queue), or if no ordering rules are used, as depicted by the positive branch from decision block 508, flow continues to block 509. Cache stashing is also disabled when the message size is too large, as depicted by the positive branch from decision block 509. For example, the message size may be compared to a threshold T0 and cache stashing may be disabled to avoid overflow of private caches. If the message size is not too large, as depicted by the negative branch from decision block 509, cache stashing is enabled at block 510. Enabling the cache stashing mechanism of the interconnect accelerates application access to the incoming data. Optionally, at block 512, the queue depth is also used to select the cache stashing target. Between the head of the queue and the queue depth threshold used to disable cache stashing, other thresholds may be used to select whether to stash the payload data in an L1, L2 or L3 cache. Locations closer to the head of the queue could be targeted to caches closer to the core. This enables messages that are expected to be read by the program sooner to be stashed closer to the core. The data is sent to target cache location at block 514 using the cache stashing mechanism of the interconnect and the method terminates at block 516.

If no matching request is found in the receive queue (RQ), as indicated by the negative branch from decision block 506, the incoming message is stored (enqueued) to the UQ. This indicates that the application does not anticipate the message and, therefore, cache stashing is disabled at block 518. Cache stashing may also be disabled at block 518 if the received message matches an out of order request deep in the RQ, as indicated by the negative branch from decision block 508. At decision block 520 it is determined whether or not the data should be targeted to the system level cache (SLC) of a home node (HN). For example, if the size of the payload data is beyond a certain size threshold T1, allocation into the SLC is disabled to prevent pollution of the SLC. Also, if the message is received out of order and the match request is deep in the RQ (indicating a less urgent message), allocation in the SLC is disabled.

As indicated by the positive branch from decision block 520, allocation in the SLC is disabled at block 522 by setting an 'allocate' attribute of the message to 'false' and flow continues to block 524. For smaller messages that match more urgent requests, the 'allocate' attribute of the message is set to 'true' at block 526. At decision block 524, it is determined if allocation in the SLC should be given a low priority or a high priority. The priority value could be set, for example, based on the message size or the position of the matching request in the receive queue (which is an indication of the message urgency). Thus, for example, if the message size is above a size threshold T2, as depicted by the positive branch from decision block 524, the priority attribute of the message is set to 'low' at block 528 and flow continues to block 530. If the message size is below the size threshold T2, as depicted by the negative branch from decision block 524, the priority attribute of the message is set to 'high' at block 534. At block 530 the message with its 'allocate' and 'priority' attributes, is sent to the home node (HN) and the process terminates at block 532. Additionally, if the queue depth of the matching message is closer to the head of RQ, the message is judged to be more urgent and is given a higher priority to indicate that the data should be inserted closer to the most-recently-used position (MRU) in the SLC. Queue depth closer to the tail of the RQ would have a lower priority and the data would be inserted closer to the LRU position. The 'priority' attribute may be a numerical value or a binary (high/low) value.

On receipt of the message and its attributes, the HN may insert data with a low 'priority' into the middle of the cache set. In this way, if the message is large, it would only pollute data with a lower recently used (LRU) position in the LRU stack. This would limit pollution of the SLC to a given subset of its entire capacity.

The method described above provides a number of advantages, including:
   (a) Acceleration of the data access by cache stashing of the incoming data anticipated by the application; and
   (b) Mitigation of the pollution of core-private or cluster-private caches by avoidance of the cache stashing or reducing priority for unexpected messages.

The method has been described above with reference to a cache stashing mechanism. However, the method may also be used in systems that employ scratchpad memories to decide if an incoming message has to be placed in scratchpad memory, which is close to a compute core, or a slower (or lower priority) memory.

Figure 6:
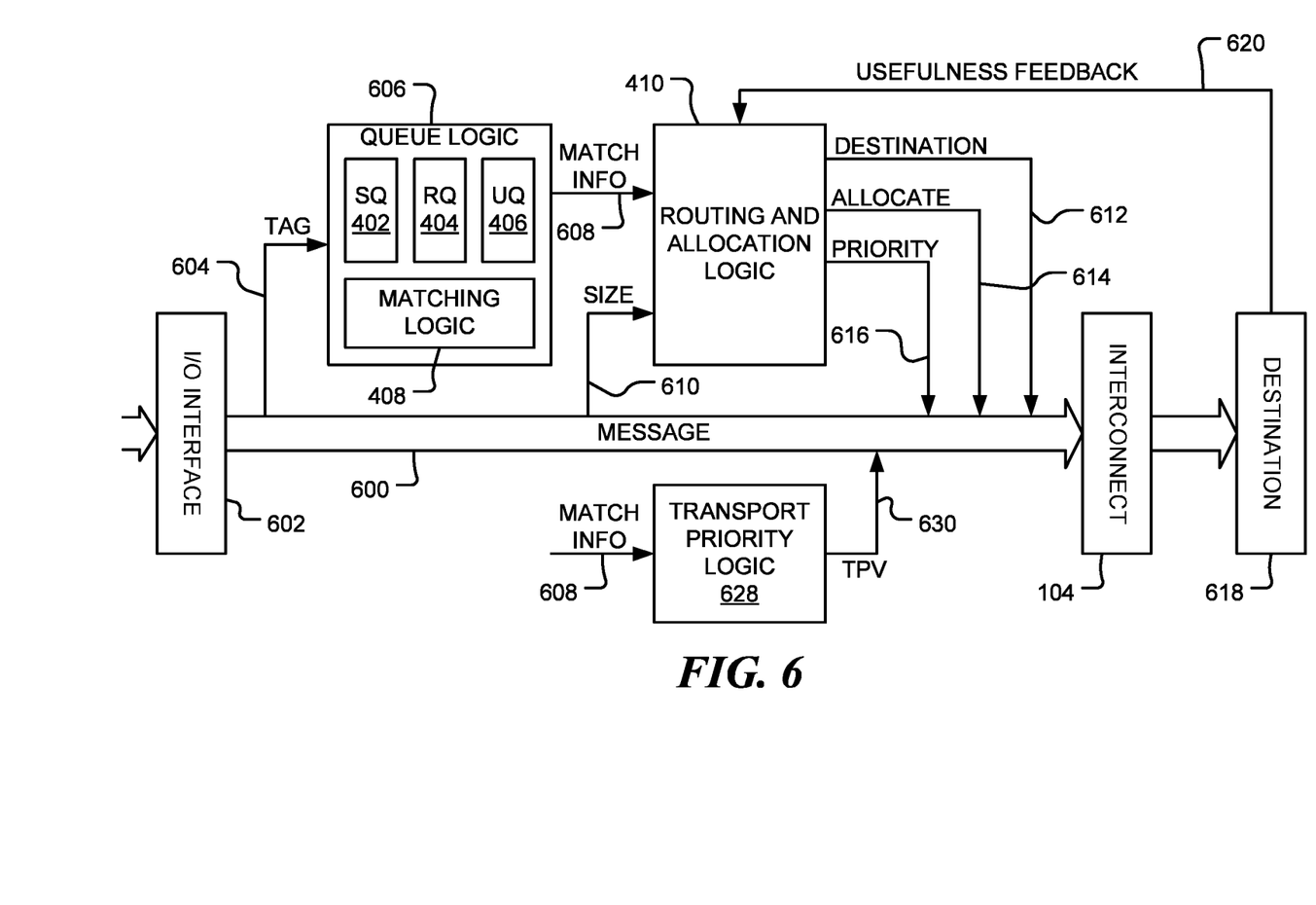
FIG. 6 is a diagrammatic representation of information flow in a data processing system, consistent with various embodiments of the disclosure.

FIG. 6 is a diagrammatic representation of information flow in a data processing system, consistent with various embodiments of the disclosure. Message 600 is received at an I/O interface 602 of a data processing system. The message may be received from a network or an I/O device, for example. The message includes a tag or other message identifier 604 that is passed to queue logic 606. Matching logic 408 determines if the tag matches a request stored in receive queue (RQ) 404 and outputs associated match information 608. The match information indicates if a match was found and may also indicate where in the RQ the matching request was located. Queue information 608 is passed to routing and allocation logic 410, together with size information 610 from the message 600. From the queue information 608 and size information 610, the routing and allocation logic 410 determines the destination 612 for the message (e.g. a cache of a processing element or a home node), an 'allocate' attribute 614 that indicates whether or not the payload data in the message should be stored in system level cache of the home node, and a 'priority' attribute 616 that indicates where in the system level cache the payload data should be stored. The message is updated with the destination 612 and attributes 614 and 616 and forwarded, via interconnect structure 104 to the destination 618. This mechanism acts as a predictor for the upcoming use of the incoming data by a core. In accordance with a further aspect of the disclosure, the predictor can be trained by the actual use of data through a feedback channel 620 from the caches into the routing and allocation logic 410. In one embodiment, when data stashed in a cache of a processing core is used by the core (this can be done tracking stashed lines), the cache sends a message 620 to I/O routing and allocation logic 410 to indicate that the stash was useful. Likewise, when stashed data is evicted before being used, the cache can send a message 620 indicating that the stash was not useful. The I/O routing and allocation logic 410 can then adjust the thresholds for stashing closer to or further from the core and allocating closer or further from the MRU position accordingly, therefore stashing in a more or less aggressive manner.

The indicator of a location of a matching request in the message receive queue (RQ), may be used to determine when the matching request is urgent or not by comparing the location of the matching request to a location threshold. When the request is recent, it is likely that the data is less urgent and the data may be sent to a home node (HN) of the data processing system. A feedback message in the feedback channel that indicates actual usage of the payload data may be used to update the location threshold.

A second aspect of the present disclosure relates to a mechanism that automatically determines the priority with which a message, received at an input/output (I/O) interface, is transported through the data processing system. This mechanism, shown as transport priority logic 628, uses the match information 608 (which indicates the context of I/O messages) to assign a transport priority with which a message, received at the I/O interface from an external resource, is transferred through interconnect 104 to destination 618. The transport priority is indicated by a transport priority value (TPV) 630 that is assigned to the incoming message 600.

Figure 7:
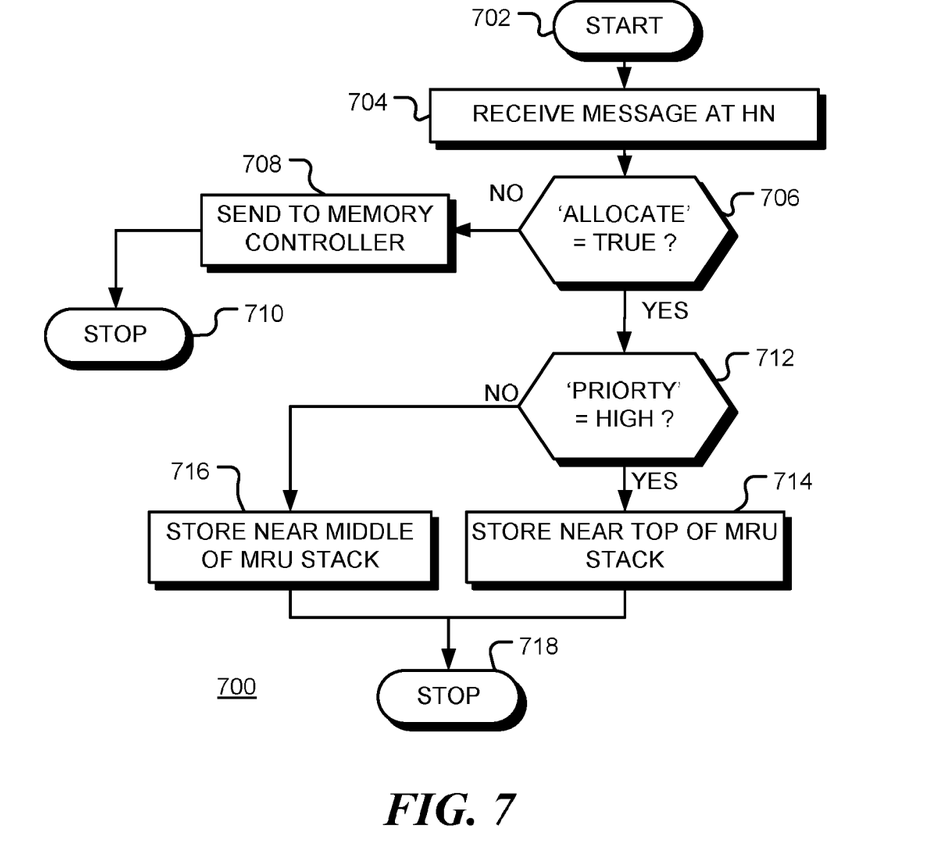
FIG. 7 is a flow chart of a method of operation of a home node, in accordance with embodiments of the disclosure.

FIG. 7 is a flow chart of a method 700 of operation of a home node, in accordance with embodiments of the disclosure. Following start block 702, a message, forwarded from an I/O interface, is received at the home node at block 704. At decision block 706, an 'allocate' attribute in the message is checked. When the 'allocate' attribute is not set to 'TRUE' as indicated by the negative branch from decision block 706, the payload data is sent, via the interconnect structure, to a memory controller at block 708 for storing in a memory, such as an off-chip memory for example. In one embodiment, writing to data to memory causes the HN to send the messages to invalidate copies of the data in the core or cluster private caches. If the system is cache coherent, all these actions will take place after or in parallel with the associated cache coherence actions. In this case, the incoming data is bypassed to memory, but the HN still sends invalidation messages. The method terminates at block 710. Conversely, when the 'allocate' attribute is set to 'TRUE' as indicated by the positive branch from decision block 706, the payload data is to be stored in a system level cache of the home node and flow continues to decision block 712. At decision block 712, the 'priority' attribute of the message checked. If the 'priority' attribute is set to 'HIGH', as depicted by the positive branch from decision block 712, the payload data is assigned a high priority in the system level cache at block 714. For example, data in the system level cache may be ordered depending on when it was most recently used (MRU). This may be implemented by maintaining a stack of data tags, for example. If the 'priority' attribute is set to 'LOW', as depicted by the negative branch from decision block 712, the payload data is stored with a lower priority in the system level cache at block 716. This increases the chance that the data will be evicted before being used, but reduces the chance of other useful data being evicted. The method terminates at block 718.

The replacement policy for data in the system level cache may be based on priorities. For example, a priority list or stack may be used. Other priority schemes include a least recently used (LRU) or pseudo-LRU policy, or the use of FIFO/LIFO queues to select victims on replacement. With all of the replacement schemes, data with high priority should be evicted later and data with low priority sooner. For example, in an LRU-based replacement policy, data is allocated closer to the MRU position for high priority and closer to the LRU position for low priority. In one embodiment, a victim cache is used as a backup for an SLC. The priority assigned to the data is used to influence whether the data is stored in the victim cache on eviction or not. A high priority message would be stored in the victim cache, and a low priority message would be sent directly to memory. It will be apparent to those of ordinary skill in the art that the low/high priority values may be used in various ways by the cache controller when managing the cache contents in general.

In an alternative embodiment, the 'priority' attribute may be a numerical value that is used by the home node to determine where to place the payload data in the system level cache.

A similar method may be used by the cache controller of a cache associated with a processing element to determine where payload data should be placed in a cache hierarchy, with higher priority data being placed closer to the processing core. For example, a cache controller may make the decision as to where, or even if, data should be stashed.

A second aspect of the present disclosure relates to a mechanism in a data processing system that automatically determines the priority with which a message, received at an input/output (I/O) interface, is transported through the data processing system. This mechanism uses the context of I/O messages to assign a transport priority with which a message, received at the I/O interface from an external resource, is transferred through the cache coherent interconnect (CCI).

In a computer network, 'Quality of Service' (QoS) mechanisms may be used within the network for controlling traffic prioritization and resource reservation. In particular, QoS mechanisms control the passage of information through the network dependent a transport priority level or value associated with the information. Information flows through a network in flow-control units or 'flits'.

In accordance with various embodiments of the disclosure, the transport priority of a message is assigned automatically, based on message attributes (such as its source address, etc.) and the status of I/O queues. The assigned transport priority is used by the QoS mechanisms of the interconnect structure and other components in the system to control transport of the message through the network.

As discussed above, the Message Passing Interface (MPI) and programming model is a de-facto standard that provides a programming model and communication services for high performance computing (HPC) applications, including scientific simulations, big-data, machine learning and analytics. MPI defines point-to-point send-receive communication semantics that are used for communication between processing elements (PEs) of a network. The send-receive semantics are realized in hardware or software using send queue (SQ) and receive queue (RQ) constructs. In order to send a message, a processing element (PE) posts a send request to SQ and in order to receive a message a PE posts a receive request to RQ. Each send and receive request can be associated with a tag that identifies the message. In addition, each request is associated with a virtual address (or I/O-vector) that provides a reference to the data payload. When a message comes from an external resource, such as an external network, the I/O interface compares the tag of the incoming message to the tags associated with requests posted on the RQ. This may be performed by custom match logic, for example. If the incoming tag matches one of the requests, it means that the application waits (or expects) on the message. If a request with matching tag cannot be found at RQ, the incoming message is redirected to the unexpected queue (UQ). UQ manages incoming messages that the application is not ready to receive.

An example of a data processing network is a multi-core computer architecture in which cache coherent interconnect (CCI) connects a set of CPU core clusters, as shown in FIG. 1, for example. In accordance with embodiments of the disclosure, the CCI provides an end-to-end quality-of-service (QoS) mechanism. Information is transported through the interconnect in information units called flits. Each flit includes a Transport Priority Value (TPV) that indicates how it is to be handled by routers and repeaters of the interconnect structure. Other components such as home nodes (HNs), memory controllers and other devices attached to the CCI may also have QoS support by, for example, allocating higher priority messages into higher priority positions in input buffers, having separate high priority buffers, or installing data in higher priority positions in a cache. Flits with higher TPV are given preference to enable bandwidth and latency requirements to be met.

The disclosed mechanism connects the SQ, RQ, UQ and I/O message matching logic (which is based on the tag or any other attribute identifying the message) to the QoS mechanism of the interconnect structure.

In one embodiment, when an incoming message from an external resource, such as a network or I/O device, is enqueued to UQ, it is assumed that the application does not anticipate the message. Consequently, the I/O interface sets the TPV to a low value when injecting the message into the CCI. However, when the matching receive request is found in the RQ, the I/O interface sets the TPV for that message to a higher value, so it is given a higher priority during its whole passage through the CCI and attached components. The associated application using the data payload in the message is accelerated by having the expected data available earlier.

This mechanism achieves two goals: (a) acceleration of data access by faster completion of data transfers, and (b) mitigation of the interference of unexpected messages in the network and attached components (by setting a lower transport priority).

For send-receive I/O employing ordering rules, based on the message tag attribute for example, the above mechanism can be extended to assign transport priority based on a location of the matching receive request in the receive queue (RQ). For example, when an incoming message arrives out of order, the matching receive tag may be located relatively deep in the RQ and the TPV can be set to a lower value. Thus, the position of the matching request in the RQ (the queue depth) may be considered when assigning a transport priority to the received message. In one embodiment, the position of the matching request in the RQ is compared to one or more threshold values when assigning the transport priority.

In general, the queue (RQ/UQ) and queue depth can be used to assign the TPV from a set of available values. Between the head of the RQ and a queue depth threshold, the QoS selection logic assigns the TPV to the highest priority available. Between the queue depth threshold and the tail of the RQ, the QoS selection logic assigns the TPV to a lower priority. Additional thresholds within the RQ and the UQ may be used to map to available intermediate values for TPV.

The threshold mechanism is a predictor for the QoS requirements for a packet containing data that will be used by a core. The predictor can be trained by the actual use of data through a feedback channel from the caches/memory controller into the I/O interface.

For example, when high priority data is accessed soon by a core soon after being received and placed in a cache, the cache can send a message to the I/O interface confirming that the assigned high priority value provided a benefit. Benefit may be assessed by monitoring the time elapsed from when cache line is written by high priority packets to when the line is used by the core. Similarly, when high priority data is accessed later than a timer threshold, the cache may send a message to the I/O interface saying that the transport priority was unnecessarily high. The I/O QoS selection logic can then adjust the thresholds for setting the TPV to higher or lower values, therefore giving higher priorities in a more or less aggressive manner.

Separate thresholds may be maintained for different processors (using the Source ID in a request, for example) or different contexts (using an address space identifier (ASID) or the Source ID in a request for example), or for different applications. In an MPI application, for example, each rank is a separate process so it has its own ASID. In addition, a separate application ID may be used. Requests coming into the RQ have a Source ID, which provides an identifier of the processing core.

While the above examples are HPC related, the matching I/O logic is not unique to HPC I/O devices. Similar tag matching QoS selection mechanisms and heuristics can be employed by any I/O mechanisms based on queue constructs, such as QoS, VLANs, and SDN technologies. Each one of the technologies associate a tag (or any other message identifying attribute) on the sender side and has an RQ that matches the packets based on the rules defined by the underlying technology.

Figure 8:
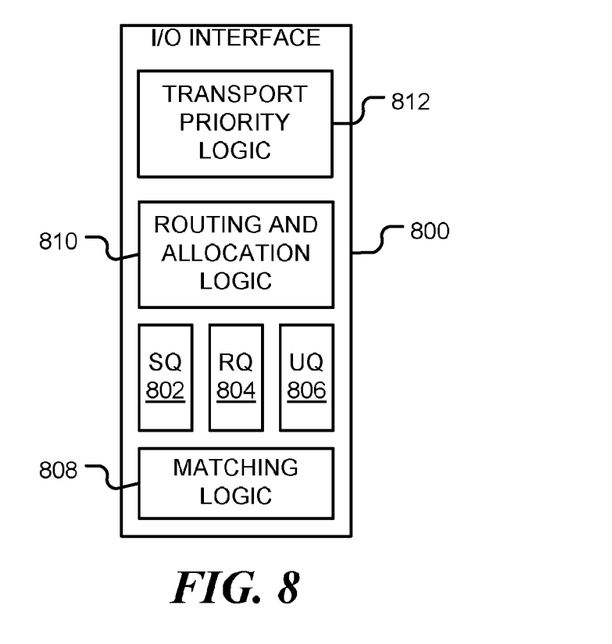
FIG. 8 is a block diagram of an input/output (I/O) interface, in accordance with various representative embodiments.

FIG. 8 is a block diagram of an input/output (I/O) interface 800, in accordance with various representative embodiments. I/O interface 800 operates in accordance with a message queuing protocol, and includes a message send queue (SQ) 802, a message receive queue (RQ) 804 and an unexpected queue (UQ) 806 for unexpected messages. In other embodiments, such as with a virtual local area network (VLAN) or a software defined network (SDN), the receive queue may be implemented as a matching table. Matching logic 808 matches sent and received messages based on the rules defined by the underlying technology. Optionally, routing and allocation logic 810, as described above may be included.

In accordance with the present disclosure, transport priority logic 812 is provided for assigning transport priority values to incoming messages received at the I/O interface 800. Transport priority logic 812 may be implemented as a component of I/O interface 800 (as shown) or may be a separate module. Transport priority logic 812 provides a mechanism that uses the SQ, RQ, UQ and I/O message matching logic (based on tag or any other attribute identifying the message) to automatically assign on-chip CCI transport priorities to received messages.

Figure 9:
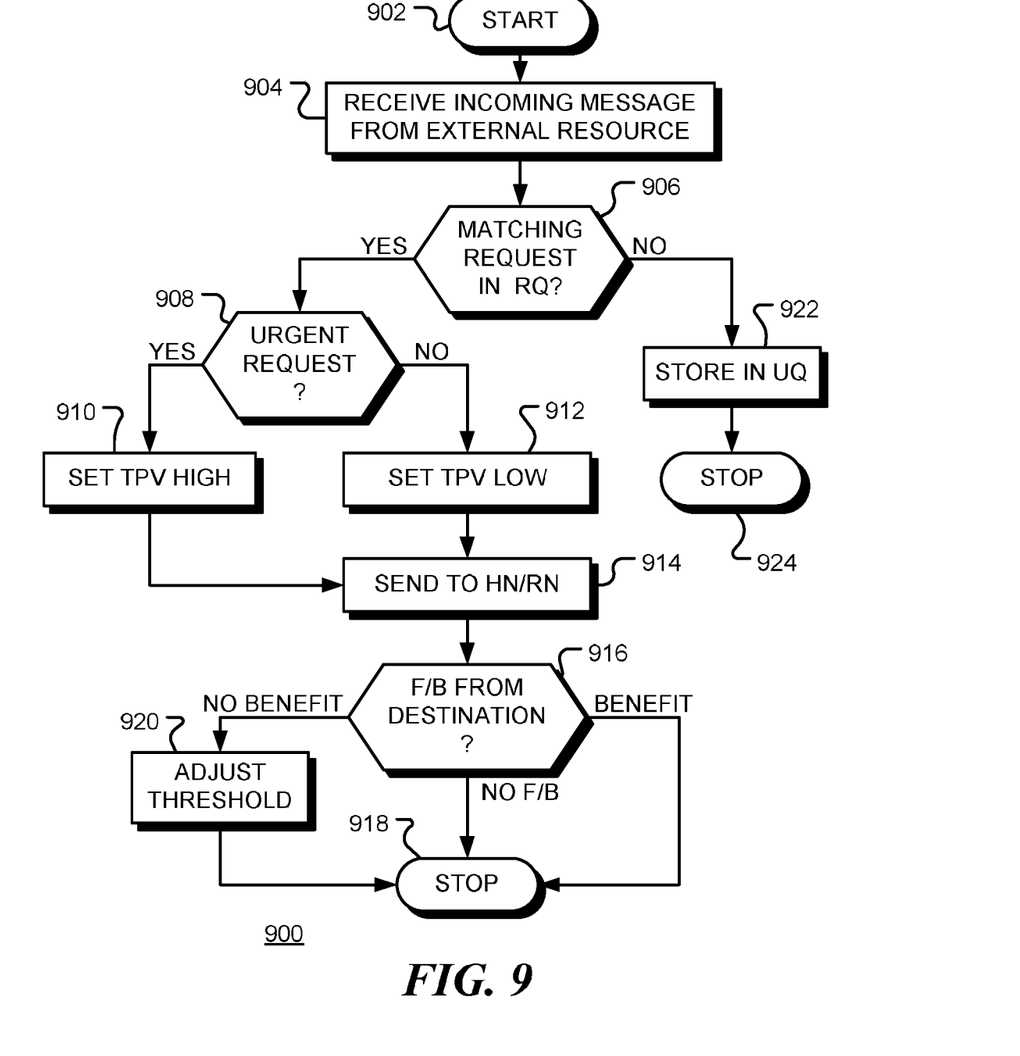
FIG. 9 is a flow chart of a method of operation of an I/O interface, in accordance with embodiments of the disclosure.

FIG. 9 is a flow chart of a method 900 of operation of an I/O interface, in accordance with embodiments of the disclosure. Following start block 902, an incoming message is received from a network or I/O device at block 904, the incoming message comprising a message identifier and payload data. Match information, determined by match logic, indicates whether the message identifier of the incoming message matches a message identifier of a receive request in a receive queue (RQ). If a matching request is found in the receive queue (RQ), as indicated by the positive branch from decision block 906, it may be appropriate to assign a high transport priority value (TPV) to the message. For a messaging protocol that employs ordering rules based on the message tag attribute, the location of the matching request in the RQ is used at decision block 908 to determine if the request was recent or old. If the request is near the head of the RQ, it is judged to be urgent, as depicted by the positive branch from decision block 908, or if no ordering rules are used, a high transport priority value (TPV) is assigned to the message at block 910. However, if the incoming message arrives out of order, which means that the matching receive tag is located relatively far from the head of the RQ (as defined by a selected threshold) in the RQ, the message is determined to be not urgent, as depicted by the negative branch from decision block 908. The message is then assigned a low transport priority value (TPV) at block 912. The message is then transported from the I/O interface to the destination node, which may be a home node (HN) or the requesting node (RN), at block 914. The message is transported through the interconnect structure of the data processing system dependent upon the transport priority value assigned to the incoming message. If there is no feedback from the destination node (e.g. from a cache controller of the node), as depicted by the 'NO F/B' branch from decision block 916, the method terminates at block 918. If there is feedback that indicates that the assignment of a high transport priority was beneficial, as depicted by the 'BENEFIT' branch from decision block 916, adjustment to the RQ threshold level may not be needed and the method terminates at block 918. However, if there is feedback that indicates that the assignment of a high transport priority was not beneficial, as depicted by the 'NO BENEFIT' branch from decision block 916, adjustment to the RQ threshold level is made at block 920. The adjustment makes it less likely that a subsequent message at this depth in the receive queue will be given a high TPV—freeing interconnect bandwidth for other messages. The method terminates at block 918.

In other embodiments, the threshold may be adjusted up or down in response to feedback from the destination nodes to optimize the utilization of the interconnect bandwidth.

If no match request is found in the RQ, as depicted by the negative branch from decision block 906, the incoming message is stored in the UQ at block 922 and the method terminates at block 924. Future receive requests may be compared to messages in the UQ and only stored in the RQ when no match is found.

The match information generated when matching an incoming message to receive requests in the RQ may include an indicator of a location of a matching request in the RQ, in which case the transport priority value may be assigned dependent upon the location of the matching request in the RQ. It may be determined whether a matching request is urgent by comparing the location of the matching request to a location threshold. Further, the transport priority value may be assigned to a high value when the request is urgent and assigned to a low value when the request is not urgent.

The incoming message may be transported from the I/O interface to the destination in the data processing system through the interconnect structure of the data processing system by splitting the incoming message into a plurality of flow control units (flits), setting a priority attribute of each flit of the plurality of flits the assigned transport priority value, and transmitting the plurality of flits through the interconnect structure. Each flit may have a 'transport priority' attribute that is set dependent upon the transport priority value.

The mechanisms described above may be implemented using hardware, software or a combination thereof. The hardware implementations may be described by instructions of a hardware description language, for example. These instructions be stored on a computer readable medium and used to design application specific hardware. The instructions may also be used to configure a configurable circuit such as a field programmable gate array for example.

As used herein, the term processor, controller or the like may encompass a processor, controller, microcontroller unit (MCU), microprocessor, and other suitable control elements. It will be appreciated that embodiments of the invention described herein may be comprised of one or more conventional processors and unique stored program instructions that control the one or more processors to implement, in conjunction with certain non-processor circuits, some, most, or all of the functions described herein. The non-processor circuits may include, but are not limited to, a receiver, a transmitter, a radio, signal drivers, clock circuits, power source circuits, and user input devices. As such, these functions may be interpreted as a method to perform functions in accordance with certain embodiments consistent with the present invention. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Those skilled in the art will recognize that the present invention has been described in terms of exemplary embodiment. The present invention could be implemented using hardware component equivalents such as special purpose hardware and/or dedicated processors which are equivalents to the invention as described and claimed. Similarly, general purpose computers, microprocessor based computers, micro-controllers, optical computers, analog computers, dedicated processors and/or dedicated hard wired logic may be used to construct alternative equivalent embodiments of the present invention.

Moreover, those skilled in the art will appreciate that a program flow and associated data used to implement the embodiments described above can be implemented using various forms of storage such as Read Only Memory (ROM), Random Access Memory (RAM), Electrically Erasable Programmable Read Only Memory (EEPROM); non-volatile memory (NVM); mass storage such as a hard disc drive, floppy disc drive, optical disc drive; optical storage elements, magnetic storage elements, magneto-optical storage elements, flash memory, core memory and/or other equivalent storage technologies without departing from the present invention. Such alternative storage devices should be considered equivalents.

Various embodiments described herein are implemented using dedicated hardware, configurable hardware or programmed processors executing programming instructions that are broadly described in flow chart form that can be stored on any suitable electronic storage medium or transmitted over any suitable electronic communication medium. A combination of these elements may be used. Those skilled in the art will appreciate that the processes and mechanisms described above can be implemented in any number of variations without departing from the present invention. For example, the order of certain operations carried out can often be varied, additional operations can be added or operations can be deleted without departing from the invention. Such variations are contemplated and considered equivalent.

Accordingly, some aspects and features of the disclosed embodiments are set out in the following numbered items:

1. A method of message transfer in a data processing system, the method comprising: receiving an incoming message at an input/output (I/O) interface of the data processing system, the incoming message comprising a message identifier and payload data; determining match information, where the match information comprises an indicator of whether the message identifier of the incoming message matches a message identifier of a receive request in a receive queue (RQ); assigning a transport priority value to the incoming message dependent upon the match information; and transporting the incoming message from the I/O interface to a destination in the data processing system through an interconnect structure of the data processing system dependent upon the transport priority value assigned to the incoming message.

2. The method of item 1, where the match information further comprises an indicator of a location of a matching request in the receive queue (RQ), where the transport priority value is assigned dependent upon the location of the matching request in the RQ.

3. The method of item 1, where the match information further comprises an indicator of a location of a matching request in the receive queue (RQ), the method further comprising: determining when the matching request is urgent by comparing the location of the matching request to a location threshold; assigning the transport priority value to a high value when the request is urgent; and assigning the transport priority value to a low value when the request is not urgent.

4. The method of item 1, further comprising: sending a feedback message from the destination of the incoming message to indicate usage of the payload data; and updating the location threshold dependent upon the feedback message.

5. The method of item 1, further comprising: storing the incoming message in an unexpected queue (UQ) when the message identifier of the incoming message matches does not match any message identifier of a message request in the receive queue (RQ).

6. The method of item 1, where transporting the incoming message from the I/O interface to the destination in the data processing system through the interconnect structure of the data processing system dependent upon the transport priority value assigned to the incoming message comprising: splitting the incoming message into a plurality of flow control units (flits); setting a 'transport priority' attribute of each flit of the plurality of flits the assigned transport priority value; transmitting the plurality of flits through the interconnect structure.

7. The method of item 6, where assigning a transport priority value to the incoming message dependent upon the match information comprises setting an attribute in one or more flits of the plurality of flits.

8. A data processing system comprising: a plurality of nodes; an interconnect structure configured to transport messages between the plurality of nodes; an input/output (I/O) interface coupled to the interconnect structure, the I/O interface capable of receiving a message incoming to the data processing system, the message comprising a message identifier and payload data; message queueing logic comprising a receive queue (RQ) and message matching logic, the message queueing logic providing match information dependent upon the message identifier and information in the RQ; and transport priority logic that assigns a transport priority value to the incoming message dependent upon the match information, where the interconnect structure is configured to transport the incoming message from the I/O interface to a destination node of the plurality of nodes dependent upon the transport priority value assigned to the incoming message.

9. The data processing system of item 8, where the interconnect structure includes at least one router comprising a first buffer for transporting messages having a first transport priority value and a second buffer for transporting messages having a second transport priority value.

10. The data processing system of item 9, where the transport priority logic is configured to add a 'transport priority' attribute to the message, and where the at least one router selectively transports the message via the first or second buffer, dependent upon the 'transport priority' attribute.

11. The data processing system of item 8, where the destination node comprises a processing element of the data processing system, a system level cache of a home node (HN) of the data processing system, or a memory, accessible via a memory controller of the data processing system.

12. The data processing system of item 8, where, when a request message for which the request message identifier matches the message identifier of the incoming message, the matching information comprises a position in the RQ and where the transport priority logic is further configured to set a value of a 'transport priority' attribute in the message transported to the destination node dependent upon the position in the RQ.

13. The data processing system of item 12, where the 'transport priority' attribute in the message transported to the destination node is dependent upon the position in the RQ relative to a threshold position.

14. The data processing system of item 13, where the transport priority logic is configured to: receive feedback information from the destination node, the feedback information indicative of the benefit of the assigned transport priority; and adjust the threshold position dependent upon the received feedback information.

15. The data processing system of item 8, where the message queueing logic further comprises a message send queue (SQ) and a message unexpected queue (UQ).

16. The data processing system of item 8, where the interconnect structure includes a quality of service (QoS) mechanism responsive to the transport priority value assigned to the message.

17. The data processing system of item 8, further comprising a cache of the destination node, where data in a message transported the destination node is installed in the cache of the destination node dependent upon the transport priority value.

The various representative embodiments, which have been described in detail herein, have been presented by way of example and not by way of limitation. It will be understood by those skilled in the art that various changes may be made in the form and details of the described embodiments resulting in equivalent embodiments that remain within the scope of the appended claims.

What is claimed is:

1. A method of message transfer in a data processing network comprising a plurality of nodes and an input/output (I/O) interface interconnected by an interconnect structure, the method comprising:
  receiving a receive request from a processing node of the data processing network at the I/O interface;
  storing a message identifier of the receive request in a receive queue (RQ) of the I/O interface;
  receiving an incoming message at the (I/O) interface of the data processing network, the incoming message comprising a message identifier and payload data;
  determining match information, where the match information comprises an indicator of whether the message identifier of the incoming message matches a message identifier of the receive request in the receive queue (RQ);
  assigning, by the I/O interface, a transport priority value to the incoming message dependent upon the match information; and
  transporting at least the payload data of the incoming message from the I/O interface to a destination in the data processing system through the interconnect structure of the data processing network;
  where transporting at least the payload data comprises controlling traffic prioritization and resource reservation in the interconnect structure dependent upon the transport priority value assigned to the incoming message.

2. The method of claim 1, where the match information further comprises an indicator of a location of the matching request in the receive queue (RQ), and where the transport priority value is assigned dependent upon the location of the matching request in the RQ.

3. The method of claim 1, where the match information further comprises an indicator of a location of the matching request in the receive queue (RQ), the method further comprising the I/O interface:
  determining when the matching request is urgent by comparing the location of the matching request to a location threshold;
  assigning the transport priority value to a high value when the request is urgent; and
  assigning the transport priority value to a low value when the request is not urgent.

4. The method of claim 3, further comprising:
  sending a feedback message from the destination of the incoming message to indicate usage of the payload data; and
  updating the location threshold dependent upon the feedback message.

5. The method of claim 1, further comprising:
  storing the incoming message in an unexpected queue (UQ) when the message identifier of the incoming message matches does not match any message identifier of a message request in the receive queue (RQ).

6. The method of claim 1, where transporting the incoming message from the I/O interface to the destination in the data processing network through the interconnect structure of the data processing network dependent upon the transport priority value assigned to the incoming message comprises:
  splitting the incoming message into a plurality of flow control units (flits);
  setting a 'transport priority' attribute of each flit of the plurality of flits the assigned transport priority value; and
  transmitting the plurality of flits through the interconnect structure.

7. The method of claim 6, where assigning the transport priority value to the incoming message dependent upon the match information comprises setting an attribute in one or more flits of the plurality of flits.

8. A data processing system comprising:
  a plurality of nodes;
  an interconnect structure configured to transport messages between the plurality of nodes, where the interconnect structure comprises a Quality of Service (QoS) mechanism for controlling traffic prioritization and resource reservation;
  an input/output (I/O) interface coupled to the interconnect structure, the I/O interface capable of receiving a message incoming to the data processing system, the message comprising a message identifier and payload data;
  message queueing logic comprising a receive queue (RQ) and message matching logic, the message queueing logic providing match information dependent upon the message identifier and information in the RQ; and
  transport priority logic that assigns a transport priority value to the incoming message dependent upon the match information, where the interconnect structure is configured to transport the incoming message from the I/O interface to a destination node of the plurality of nodes by controlling traffic prioritization and resource reservation in the QoS mechanism of the interconnect structure dependent upon the transport priority value assigned to the incoming message.

9. The data processing system of claim 8, where the interconnect structure includes at least one router comprising a first buffer for transporting messages having a first transport priority value and a second buffer for transporting messages having a second transport priority value.

10. The data processing system of claim 9, where the transport priority logic is configured to add a 'transport priority' attribute to the message, and where the at least one router selectively transports the message via the first or second buffer, dependent upon the 'transport priority' attribute.

11. The data processing system of claim 8, where the destination node comprises a processing element of the data processing system, a system level cache of a home node (HN) of the data processing system, or a memory, accessible via a memory controller of the data processing system.

12. The data processing system of claim 8, where, when a request message for which the request message identifier matches the message identifier of the incoming message, the matching information comprises a position in the RQ and where the transport priority logic is further configured to set a value of a 'transport priority' attribute in the message transported to the destination node dependent upon the position in the RQ.

13. The data processing system of claim 12, where the 'transport priority' attribute in the message transported to the destination node is dependent upon the position in the RQ relative to a threshold position.

14. The data processing system of claim 13, where the transport priority logic is configured to:
receive feedback information from the destination node, the feedback information indicative of the benefit of the assigned transport priority; and
adjust the threshold position dependent upon the received feedback information.

15. The data processing system of claim 8, where the message queueing logic further comprises a message send queue (SQ) and a message unexpected queue (UQ).

16. The data processing system of claim 8, further comprising a cache of the destination node, where data in a message transported to the destination node is installed in the cache of the destination node dependent upon the transport priority value.

17. The data processing system of claim 16, where, in the cache of the destination node, data with a higher transport priority value is installed closer to a MRU position than data with a lower transport priority value.

* * * * *